(12) United States Patent
Novero et al.

(10) Patent No.: US 11,321,982 B2
(45) Date of Patent: May 3, 2022

(54) LIVESTOCK BIOSECURITY SYSTEM AND METHOD OF USE

(71) Applicant: Novetechnologies, LLC, Fort Calhoun, NE (US)

(72) Inventors: Anthony K. Novero, Omaha, NE (US); Ronald L. Novero, Fort Calhoun, NE (US)

(73) Assignee: Novetechnologies, LLC, Fort Calhoun, NE (US)

( * ) Notice: Subject to any disclaimer, the term of this patent is extended or adjusted under 35 U.S.C. 154(b) by 0 days.

(21) Appl. No.: 16/287,018

(22) Filed: Feb. 27, 2019

(65) Prior Publication Data

US 2019/0197802 A1 Jun. 27, 2019

Related U.S. Application Data

(62) Division of application No. 15/841,875, filed on Dec. 14, 2017, now Pat. No. 10,242,515.

(Continued)

(51) Int. Cl.
*G07C 9/25* (2020.01)
*G07C 9/00* (2020.01)
(Continued)

(52) U.S. Cl.
CPC ............... *G07C 9/257* (2020.01); *G06F 7/00* (2013.01); *G06F 21/32* (2013.01); *G06Q 10/00* (2013.01);
(Continued)

(58) Field of Classification Search
CPC ....... G06F 7/00; G06F 21/32; G06K 9/00006; G06K 9/00617; G06Q 10/00;
(Continued)

(56) References Cited

U.S. PATENT DOCUMENTS 7,159,778 B1 1/2007 Kochevar et al.
7,455,224 B2 11/2008 Kochevar et al.
(Continued)

FOREIGN PATENT DOCUMENTS

EP 2712454 A1 4/2015
WO 2006/078943 A2 7/2006
(Continued)

OTHER PUBLICATIONS

European Patent Office, Partial Supplementary European Search Report, dated May 7, 2020.
(Continued)

*Primary Examiner* — Stephen R Burgdorf
(74) *Attorney, Agent, or Firm* — Luke C. Holst; McGrath North Mullin & Kratz, PC LLO (57) ABSTRACT

The present invention relates in general to a biosecurity system for the livestock industry, and more specifically, animal production facilities. The livestock biosecurity system comprises a biometric recognition component, a cloud database, and a smart device (e.g., smartphone, tablet, laptop, etc.). A purpose of the livestock biosecurity system is to track person(s) of interest and verify that persons of interest attempting to gain access to an animal production facility are compliant with pre-set biosecurity protocols. The livestock biosecurity system determines whether the person(s) of interest should or should not be granted entry into an animal production facility based on the preset biosecurity protocols and further provides employee oversight at the facility.

17 Claims, 4 Drawing Sheets

Related U.S. Application Data (60) Provisional application No. 62/434,034, filed on Dec. 14, 2016.

(51) Int. Cl.
| | |
|---|---|
| *G06Q 10/00* | (2012.01) |
| *G06Q 50/02* | (2012.01) |
| *G07C 9/28* | (2020.01) |
| *G07C 9/37* | (2020.01) |
| *G07C 9/38* | (2020.01) |
| *G07C 9/27* | (2020.01) |
| *G07C 9/32* | (2020.01) |
| *G06F 7/00* | (2006.01) |
| *G06F 21/32* | (2013.01) |
| *G06Q 50/26* | (2012.01) |
| *G06V 40/12* | (2022.01) |
| *G06V 40/18* | (2022.01) |

(52) U.S. Cl.
CPC ............ *G06Q 50/02* (2013.01); *G06Q 50/26* (2013.01); *G07C 9/00* (2013.01); *G07C 9/27* (2020.01); *G07C 9/28* (2020.01); *G07C 9/37* (2020.01); *G07C 9/38* (2020.01); *G06V 40/12* (2022.01); *G06V 40/197* (2022.01); *G07C 9/32* (2020.01)

(58) Field of Classification Search
CPC .. G06Q 10/087; G06Q 10/10; G06Q 20/3227; G06Q 20/40145; G06Q 30/018; G06Q 30/0609; G06Q 50/02; G07C 9/00; G07C 9/257; G07C 9/27; G07C 9/28; G07C 9/32; G07C 9/37; G07C 9/38; G07F 7/1008; G16H 10/65; H04L 63/0861
USPC ........................................................ 340/5.52
See application file for complete search history.

(56) References Cited

U.S. PATENT DOCUMENTS

| | | | |
|---|---|---|---|
| 7,475,812 B1 * | 1/2009 | Novozhenets | G07C 9/28 235/382 |
| 7,681,527 B2 | 3/2010 | Pratt | |
| 7,810,451 B2 | 10/2010 | Pratt | |
| 7,836,850 B2 | 11/2010 | Pratt | |
| 7,925,887 B2 | 4/2011 | Burton | |
| 8,025,222 B2 | 9/2011 | Kochevar et al. | |
| 8,037,846 B2 | 10/2011 | Pratt | |
| 8,251,287 B2 | 8/2012 | Kochevar | |
| 8,256,381 B2 | 9/2012 | Pratt | |
| 8,505,488 B2 | 8/2013 | Pratt | |
| 9,087,233 B2 | 7/2015 | Heringslack | |
| 9,124,930 B2 | 9/2015 | Johnson et al. | |
| 9,298,999 B2 | 3/2016 | Sahin et al. | |
| 9,552,684 B2 | 1/2017 | Bacco et al. | |
| 9,600,845 B2 | 3/2017 | Fadell et al. | |
| 9,626,841 B2 | 4/2017 | Fadell et al. | |
| 9,640,055 B2 | 5/2017 | Fadell et al. | |
| 9,711,036 B2 | 7/2017 | Fadell et al. | |
| 9,773,361 B2 | 9/2017 | Wong | |
| 9,953,514 B2 | 4/2018 | Fadell et al. | |
| 9,990,202 B2 | 6/2018 | Toll et al. | |
| 10,013,825 B2 | 7/2018 | Belhadia | |
| 10,274,909 B2 * | 4/2019 | Lyman | H04L 12/2803 |
| 2003/0177370 A1 * | 9/2003 | Smith | G07C 9/28 713/186 |
| 2008/0136649 A1 | 6/2008 | Van de Hey et al. | |
| 2011/0001606 A1 * | 1/2011 | Charych | G07C 9/28 340/5.7 |
| 2011/0228989 A1 | 9/2011 | Burton | |
| 2012/0114251 A1 * | 5/2012 | Solem | G06V 40/171 382/195 |
| 2012/0200601 A1 * | 8/2012 | Osterhout | G02B 27/0093 345/633 |
| 2012/0260322 A1 * | 10/2012 | Logan | G06F 21/33 726/6 |
| 2013/0150117 A1 * | 6/2013 | Rodriguez | G06K 9/00892 455/550.1 |
| 2013/0278716 A1 * | 10/2013 | Kennedy | G01S 17/89 348/42 |
| 2014/0074742 A1 | 3/2014 | Pratt | |
| 2015/0109128 A1 | 4/2015 | Fadell et al. | |
| 2015/0116106 A1 | 4/2015 | Fadell et al. | |
| 2015/0116107 A1 | 4/2015 | Fadell et al. | |
| 2015/0127712 A1 | 5/2015 | Fadell et al. | |
| 2015/0156030 A1 | 6/2015 | Fadell et al. | |
| 2016/0180060 A1 | 6/2016 | Nelson | |
| 2016/0328894 A1 | 11/2016 | Zhang | |

FOREIGN PATENT DOCUMENTS

| | | |
|---|---|---|
| WO | 2015/006858 A1 | 1/2015 |
| WO | 2016/027271 A1 | 2/2016 |

OTHER PUBLICATIONS

USDA et al: Nahames Guidelines Biosecurity National Animal Health Emergency Management System Foreign Animal Disease Preparedness & Response Plan. Jun. 2016 URL: http://www.cfsph.iastate.edu/pdf/fad-prep-nahems-guidelines-biosecurity.

European Patent Office, Extended European Search Report dated Sep. 18, 2020.

* cited by examiner

```
┌─────────────────────────────────────────────────────────────────────┐
│           Providing a Livestock Biosecurity System (64)             │
└─────────────────────────────────────────────────────────────────────┘
                                    ↓
┌─────────────────────────────────────────────────────────────────────┐
│         Installing the Livestock Biosecurity System in a Property (66)         │
└─────────────────────────────────────────────────────────────────────┘
                                    ↓
┌─────────────────────────────────────────────────────────────────────┐
│   Scanning Person(s) of Interest Attempting to Gain Entry into the Property via a  │
│       Biometric Recognition Component of the Livestock Biosecurity System (68)     │
└─────────────────────────────────────────────────────────────────────┘
                                    ↓
┌─────────────────────────────────────────────────────────────────────┐
│              Verifying the Identity of the Person(s) of Interest (70)              │
└─────────────────────────────────────────────────────────────────────┘
                                    ↓
┌─────────────────────────────────────────────────────────────────────┐
│  Determining whether Permission to Enter the Property has been Authorized for the  │
│                           Person(s) of Interest (72)                           │
└─────────────────────────────────────────────────────────────────────┘
                                    ↓
┌─────────────────────────────────────────────────────────────────────┐
│  Granting or Denying Entry of the Person(s) of Interest into the Property based on │
│                           Biosecurity Protocols (74)                           │
└─────────────────────────────────────────────────────────────────────┘
                                    ↓
┌─────────────────────────────────────────────────────────────────────┐
│ Utilizing a Smart Device to Bypass Biometric Recognition Component if Inoperable   │
│               or Denied Entry is Believed to be Erroneous (76)                 │
└─────────────────────────────────────────────────────────────────────┘
                                    ↓
┌─────────────────────────────────────────────────────────────────────┐
│  Optionally Incorporating Accountability Settings to provide Oversight at Property (78)  │
└─────────────────────────────────────────────────────────────────────┘
```

FIG. 2

LIVESTOCK BIOSECURITY SYSTEM AND METHOD OF USE

CROSS REFERENCE TO RELATED APPLICATIONS

This application is a divisional of application Ser. No. 15/841,875, filed Dec. 14, 2017, which claims priority under 35 U.S.C. § 119 to U.S. Provisional Application Ser. No. 62/434,034 filed Dec. 14, 2016, herein incorporated by reference in their entirety.

FIELD OF THE INVENTION

The present invention relates in general to a biosecurity system for the livestock industry, and more specifically, segments of the industry at highest risk of pathogen intrusion: animal production facilities. The purpose of the invention is to provide a system and method of providing access management to any given animal production facility dependent on a potential entrant's past whereabouts.

BACKGROUND OF THE INVENTION

In the livestock industry animals are often housed in animal production facilities, also known as livestock confinement facilities, comprising massive climate-controlled buildings or feedlots housing tens or even hundreds of thousands of animals in close quarters. For these reasons, the livestock industry is highly susceptible to pathogen intrusion which may result in infectious diseases, increased costs for the livestock producer and, in severe cases, even death of the animal. Two segments of the livestock industry are at a higher risk of pathogen intrusion, in particular, poultry and swine producers. Poultry producers can be further defined to include egg laying facilities, chicken broilers and turkey growers. Swine producers typically include farrowing, nursery and finishing operations. In the United States alone, livestock confinement facilities comprise around 270,000 individual buildings that need biosecurity protection from unauthorized entries that may transmit harmful pathogens.

While livestock producers have taken steps to mitigate pathogen transmission (e.g., air filtering, domestic bird populations, on-site dead mulching facilities, etc.), there is one glaring exception: the people entering their animal production facility. Personnel, visitors and repair contractors routinely enter animal production facilities and therefore present a major pathogen vector that is largely unregulated throughout the livestock industry. Such individuals that enter an animal production facility are simply banned from entering other off-site animal production facilities for a certain time period in order to prevent the transmission of pathogens, and often rely on the individual's integrity and memory for compliance. Moreover, the length of time of this ban is arbitrarily decided by the livestock producer based on their particular health concerns and is thus inconsistent throughout the livestock industry.

Presently, the most common form of biosecurity in the livestock industry comprises a paper log kept at the front desk of an animal production facility. The paper log records a date of last known animal contact and location for each individual entering the animal production facility. This rudimentary approach lends itself to inaccuracies that frequently end in breached biosecurity protocols. For example, paper logs can be easily adulterated, do not account for memory lapses and require a costly, in-person attendant to monitor the entrance of each animal production facility at all times.

More advanced forms of biosecurity that currently exist in the livestock industry comprise proprietary identification systems that require an identification card for admission into a livestock confinement facility. However, proprietary identification systems developed for one particular livestock producer at their livestock confinement facility may be inoperable or nonexistent at another producer's facility. Consequently such proprietary identification systems provide little or no value for identifying potential breaches from individuals coming from outside the system. Thus, there is a need for a livestock biosecurity system and method of use that is accurate, cost-efficient and uniform across the livestock industry.

BRIEF SUMMARY OF THE INVENTION

Therefore, it is a principal object, feature, and/or advantage of the present invention to overcome the aforementioned deficiencies in the art and provide an industry-wide controlled access system and method that manages biosecurity protocols at the entrance of each animal production facility.

An additional object, feature, and/or advantage of the present invention is to track persons of interest and verify that persons of interest attempting to gain access to an animal production facility are compliant with pre-set biosecurity protocols.

Another object, feature, and/or advantage of the present invention is to identify in real-time a particular person of interest attempting to gain entry into the animal production facility.

Yet another object, feature, and/or advantage of the present invention is to provide accountability settings to confirm whether the biosecurity protocols are being followed by employees and/or animal production facility managers.

A further object, feature, and/or advantage of the present invention is to provide an intelligent 3D camera to identify any particular individual attempting to gain entry into the animal production facility by that individual's facial shape and symmetry.

A still further object, feature, and/or advantage of the present invention is to provide the ability to identify specific persons of interest and/or a plurality of persons of interest (e.g., 2-12 individuals) simultaneously.

An additional object, feature, and/or advantage of the present invention is to provide the ability to identify specific persons of interest and/or a plurality of persons of interest at distances of up to approximately 25 feet away.

Another object, feature, and/or advantage of the present invention is to provide the ability to autonomously identify persons of interest, verify their identity, authorization and cleanliness levels.

Yet another object, feature, and/or advantage of the present invention is to grant or deny access into an animal production facility using automated door locking mechanisms without requiring a costly in-person attendant monitoring the entrance.

A further object, feature, and/or advantage of the present invention is to mitigate major pathogen vectors from entering animal production facilities via personnel, visitors and repair contractors.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a livestock biosecurity system is provided. The livestock biosecurity system comprises a biometric recognition component, a cloud database, and a smart device (e.g., smartphone, tablet, laptop, etc.). The biometric recognition component may be placed near entrances of an animal production facility, wherein the biometric recognition component verifies the identity of each individual attempting to gain entry into the animal production facility by comparing such identities to information stored in the cloud database. Information may be stored in the cloud database according to biosecurity protocols set by an animal production facility manager and/or livestock owner. For example, this information may include the identities of persons of interest, the movements of persons of interest tracked from one animal production facility to another animal production facility for a set time period (e.g., visitation logs), invitations for admission into animal production facilities outside the livestock biosecurity system, cleanliness levels of persons of interest in view of recent contact with known pathogens, admission overrides, and whether a person of interest has traveled to a certain geographic location where biosecurity concerns are present. After the livestock biosecurity system of the present invention verifies whether the person of interest is authorized for entry into the animal production facility, the person of interest may be admitted or denied entry into the facility.

According to another aspect of the present invention, the biosecurity protocols of the livestock biosecurity system may comprise employee accountability settings. The employee accountability settings may confirm whether a contractually obligated livestock producer is routinely checking on animals under their care as their contract stipulates with the livestock owner. The accountability settings may also confirm whether employees at a particular animal production facility are timely showing up for and leaving work. The accountability settings may additionally confirm whether the biosecurity protocols are actually being followed by employees and/or animal production facility managers at a particular animal production facility. Thus, the livestock biosecurity system of the present invention may also provide employee accountability capabilities to conveniently provide oversight at an animal production facility.

According to a further aspect of the present invention, a method of providing access management to an animal production facility is provided. The method may comprise providing the livestock biosecurity system of the present invention as described above. The method may further comprise installing the livestock biosecurity system in an animal production facility. The method may also comprise identifying persons of interest attempting to gain entry into the animal production facility, and determining whether the persons of interest should be granted entry based on the set biosecurity protocols. The method may additionally comprise either granting or denying entry of the persons of interest into the animal production facility based on the biosecurity protocols set in the livestock biosecurity system of the present invention. Optionally, the method may also comprise incorporating accountability settings into the biosecurity protocols of the livestock biosecurity system to provide oversight at the animal production facility.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIGS. 1-2 represent a livestock biosecurity system of the present invention and a method of providing access management for an animal production facility.

DETAILED DESCRIPTION OF THE INVENTION

Figure 1:
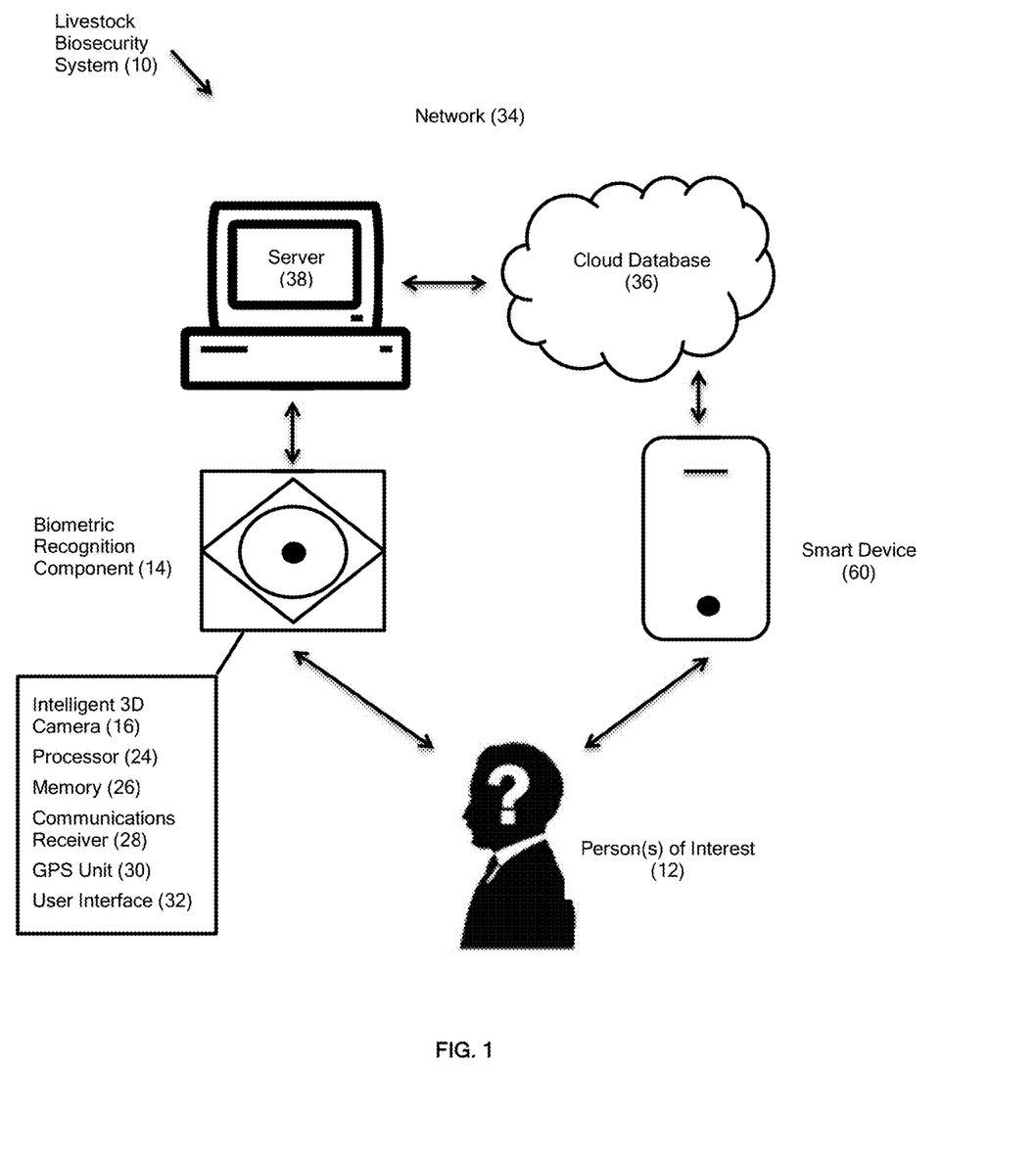
FIG. 1 is a schematic view of a livestock biosecurity system of the present invention.

FIG. 1 illustrates one aspect of the present invention, a livestock biosecurity system (10) that tracks persons of interest (12) seeking access to a property and verifies whether such persons of interest (12) have been approved for entry according to pre-set biosecurity protocols (40). "Biosecurity" is defined by the present invention as a set of measures taken to protect property, humans and/or livestock from the entry and spread of pests, disease and pathogens. "Property" is defined by the present invention as a farm, ranch, feedlot, animal production facility, livestock confinement facility, meat processing facility, or any other closed geographical area where the spread of pathogens to livestock may be a concern to livestock producers. "Livestock" is defined by the present invention as domesticated animals raised in an agricultural setting to produce commodities such as meat, leather and wool and includes, but is not limited to, swine, poultry, beef cattle, dairy cattle and goats, sheep, fish and horses. "Persons of interest" (12) is defined by the present invention as an individual or plurality of individuals attempting to gain entry into a property.

As shown in FIG. 1, the livestock biosecurity system (10) comprises a biometric recognition component (14). The biometric recognition component (14) may comprise sensors or scanning devices such as radio frequency tags, barcode scanners, iris scanners, fingerprint scanners, digital cameras, and other security means standard in the industry. The biometric recognition component (14) may be installed near entrances of a property or a plurality of properties utilizing the livestock biosecurity system (10).

Figure 1A:
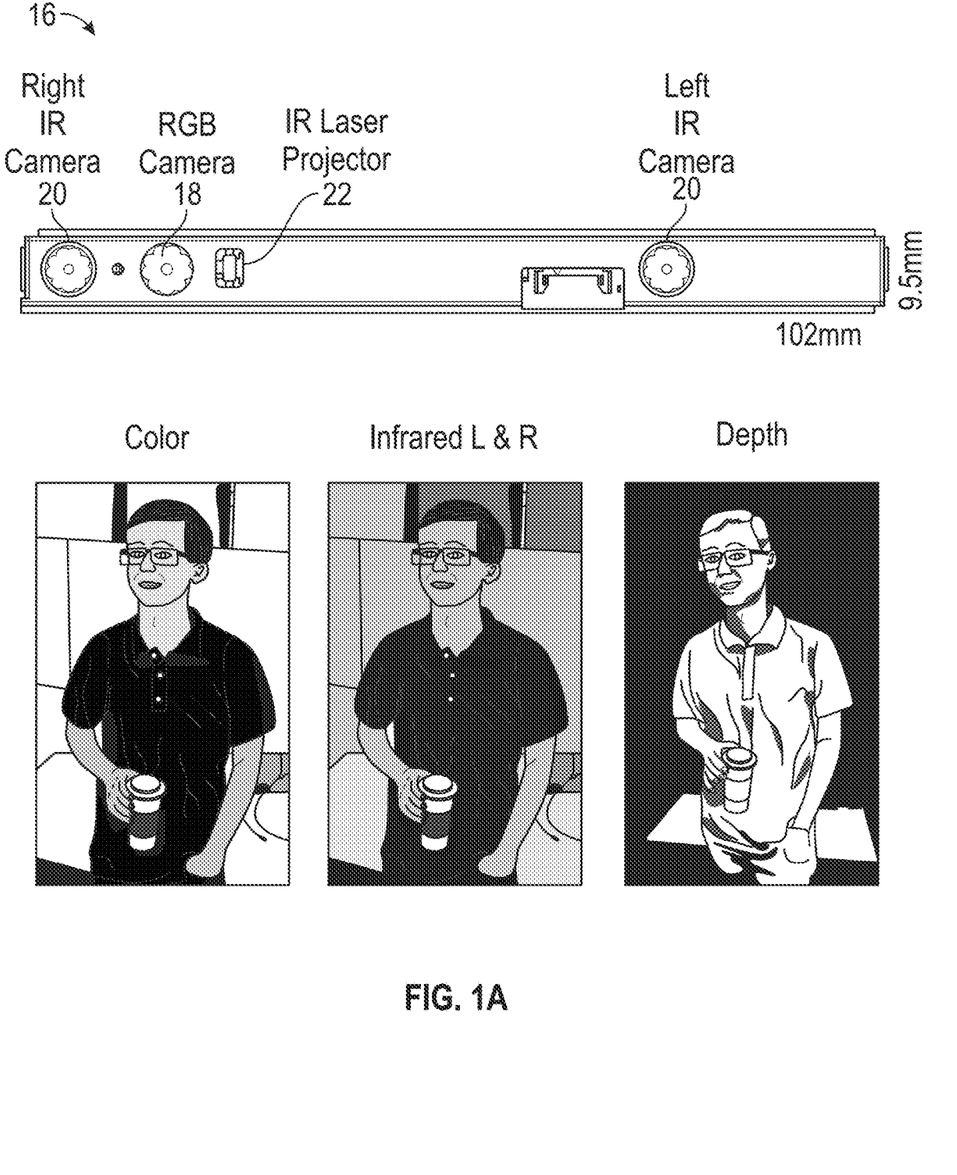
FIG. 1A is a perspective side view of an intelligent 3D camera that may be utilized in the livestock biosecurity system of FIG. 1.

A preferred biometric recognition component (14) comprises an intelligent 3D camera. The intelligent 3D camera may be configured to scan the face of person(s) of interest (12) attempting to gain entry into a property. The intelligent 3D camera provides scans far more complex than simple facial recognition offered by traditional digital cameras. For example, the intelligent 3D camera may be used to calculate the distance between objects, separate objects on different planes, track gestures and provide a 3D map of the contours of a person of interest's (12) face. This information allows the intelligent 3D camera to instantly confirm the identity of a person of interest (12) with 99.9% accuracy at a distance of up to approximately 25 feet. These same capabilities also apply when simultaneously confirming the identity of a plurality of person(s) of interest (12) (e.g., 2-12 persons of interest), thus, making use of the intelligent 3D camera by the present invention far superior to traditional security measures incorporating a simple digital camera. One example of an intelligent 3D camera currently offered in the technology industry is illustrated in FIG. 1A. As shown in FIG. 1A, the intelligent 3D camera (16) may comprise a conventional color image sensor camera (e.g., CMOS camera, CCD camera or RGB camera) (18), at least one near infrared image sensor (20), an infrared laser projector (22) and an image processor (not shown). FIG. 1A is provided for exemplary purposes only, as it is contemplated by the present invention that other types of intelligent 3D cameras offered in the technology industry may also be utilized, such as 3D "Time-of-Flight" image sensors offered by technology company pmd.

As further shown in FIG. 1, the biometric recognition component (14) may further comprise a processor (24) for running local software applications, memory (26), a communications receiver (28), a GPS unit (30), and a user interface (32). In particular, the memory (26) of the biometric recognition component (14) may be configured to store identification profiles (44) of persons of interest (12) attempting to gain entry into the specific property where the biometric recognition component (14) is located. The communications receiver (28) may connect the biometric recognition component (14) with a network (34) such as the Internet, an intranet, or a local area network in either a wired or wireless fashion (e.g., BLUETOOTH®, Wi-Fi, cellular and/or satellite communication). The GPS unit (30) of the biometric recognition component (14) may communicate a timestamp and the latitude/longitude coordinates to the cloud database (36) via the communications receiver (28), and/or the biometric recognition component (14) may have a predetermined GPS location assigned to a specific property. The user interface (32) of the biometric recognition component (14) may comprise a display screen and input capabilities (e.g., touch screen, keypad, etc.), wherein the user interface (32) is configured to display announcements, alerts as to what is happening inside the property, and summaries as to why access may have been granted or denied into the property. It is further contemplated by the present invention that indicators, such as LED red or green lights, may also be utilized to notify person(s) of interest (12) their status of admission into the property. The biometric recognition component (14) may be a custom fabricated unit or may alternatively be built using industry standard hardware components manufactured by multinational companies such as Intel Corp., NimbeLink, LLC and Microsoft Corp. to support compatibility with other industry participants.

As still further shown in FIG. 1, the livestock biosecurity system (10) additionally comprises a cloud database (36) connected to the biometric recognition component (14) over the network (34). The cloud database (36) may be connected to the biometric recognition component (14) via an intermediate server (38). The server (38) may provide an interface between the biometric recognition component (14) and the cloud database (36) over the network (34). The server (38) may also act as an application platform on which to run operational software applications for biosecurity protocols (40) of the biometric security system (10). Alternatively or in addition to, biosecurity protocols (40) may also be performed by the local software applications, processor (24) and memory (26) on the biometric recognition component (14).

Figure 1B:
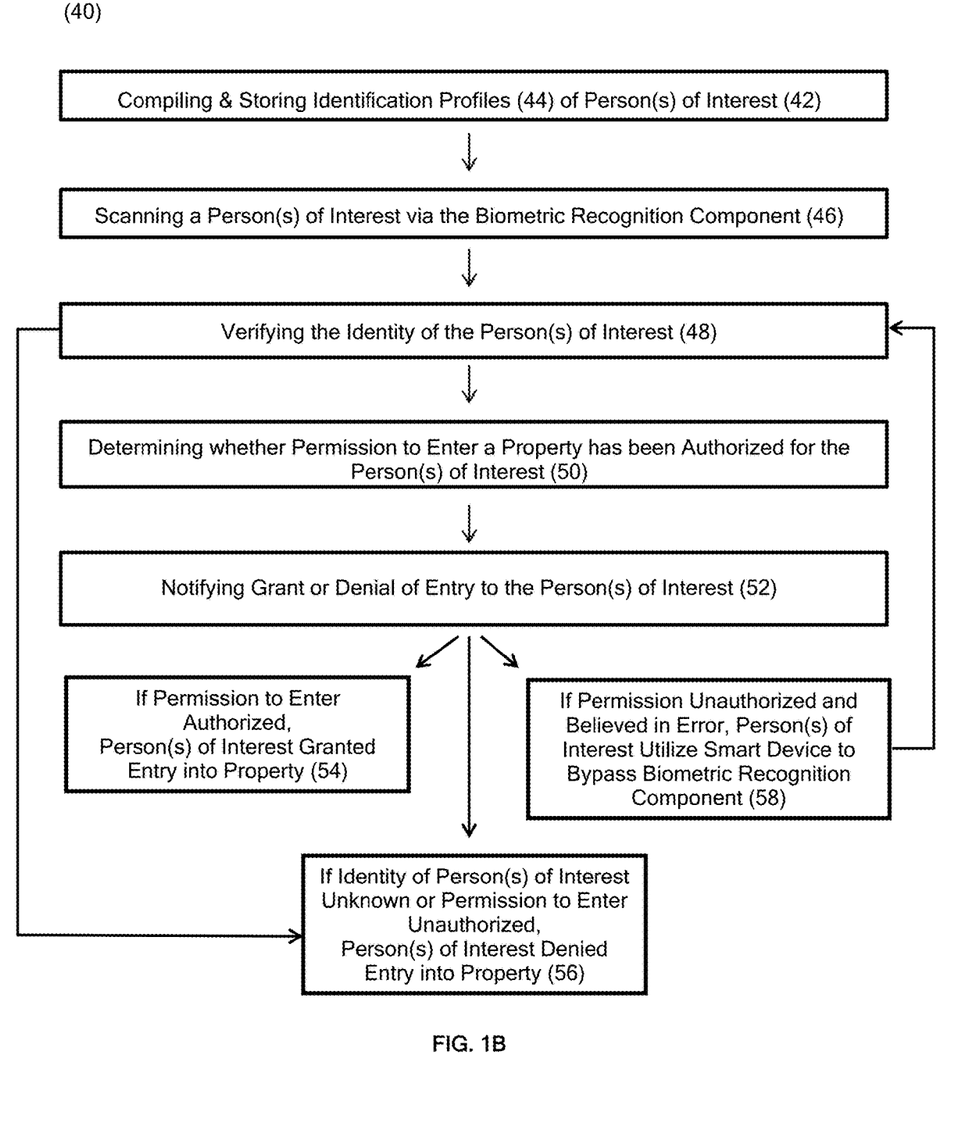
FIG. 1B is a biosecurity protocol flowchart of the livestock biosecurity system of FIG. 1.

FIG. 1B illustrates exemplary biosecurity protocols (40) that may be predetermined by a livestock owner and/or manager of the property or properties, such as a regional animal production facilities manager, according to site-specific and/or industry-wide health standards. The biosecurity protocols (40) may comprise compiling and storing (42) in the memory (26) and/or the cloud database (36) identification profiles (44) of persons of interest (12). The identification profiles (44) may comprise the identities of persons of interest (12), the movements of persons of interest (12) tracked from one property to another for any set period of time (e.g., visitation logs), admission into a property outside the livestock biosecurity system (10), cleanliness levels of persons of interest (12) in view of recent contact with known pathogens, admission overrides, and whether a person of interest (12) has traveled to a certain geographic location where biosecurity concerns are present. Identification profiles (44) stored in the memory (26) and/or cloud database (36) may also include names, contact information, phone numbers, pin numbers, IP addresses, identification numbers, inherent qualities (e.g., weight, dimensions) personal characteristics, photographs, background checks, iris scans, fingerprints, time stamps, location data, social security numbers, barcodes, radiofrequency tags, property compliance rules (e.g., analysis of safety, drug and job certification tests, police records, credit histories, etc.) and any additional types of information necessary to identify persons of interest (12). Identification profiles (44) may be manually inputted into the memory (26) and/or cloud database (36) by a site administrator during a registration process and prior to allowing persons of interest (12) into a property so as to serve as a point of reference during future identification verifications and entry authorizations. Alternatively or in addition to, identification profiles (44), timestamps and GPS locations may be automatically collected at a property via the biometric recognition component (14) scanning person(s) of interest (12) seeking entry into the property and stored in the memory (26) and/or cloud database (36). Typically the memory (26) of the biometric recognition component (14) stores identification profiles (44) of person(s) of interest (12) that commonly seek access to the specific property where the biometric recognition component (14) is located. Thus, the memory (26) of the biometric recognition component (14) is more limited in scope as compared to the cloud database (36), which may comprise the identification profiles (44) for the entire livestock biosecurity system (10).

As further shown in FIG. 1B, the biosecurity protocols (40) may comprise scanning (46) a person of interest (12) or a plurality of persons of interest (12) attempting to gain entry into a property using the biometric recognition component (14). The scanned information, including a timestamp and a GPS location of the biometric recognition component (14), may be sent via the communications receiver (28) to the cloud database (36) over the network (34) and/or to the memory (26) of the biometric recognition component (14). The biosecurity protocols (40) may further comprise verifying (48) the identity of the scanned person(s) of interest (12) by comparing the scanned information with the stored identification profiles (44) in the memory (26) and/or cloud database (36). If there is no match between the compared scanned information and stored identification profiles (44) and therefore the identity of the person(s) of interest is unknown, permission for the person(s) of interest (12) to enter the property is denied (56) by the livestock biosecurity system (10). On the other hand, if there is a match between the scanned information and the stored identification profiles (44) in the memory (26) and/or cloud database (36) the identity of the person(s) of interest (12) is verified (48). Once the identity of the person(s) of interest (12) is verified (48), the biosecurity protocols (40) may comprise determining whether permission to enter the property has been authorized (50) for the person(s) of interest (12) in view of collective information stored in their corresponding identification profile(s) (44). For example, based on collective information stored in an identification profile (44) the biosecurity protocols (40) may either authorize or deny a person of interest (12) entry into a property because of past movements tracked from one property to another for any set period of time (e.g., visitation logs), admission into a property outside the livestock biosecurity system (10), cleanliness levels in view of recent contact with known pathogens, admission overrides, travel to a certain geographic location where biosecurity concerns are present, and analysis of background checks, safety, drug and job certification tests, police records, or other reasons set forth by the livestock owner and/or manager of the property in the biosecurity protocols (40).

Still further shown in FIG. 1B, if the biosecurity protocols (40) determine that permission to enter the property has been authorized (54) for the person(s) of interest (12), such authorization may be notified (52) to the person(s) of interest (12) via the user interface (32) on the biometric recognition component (14). An optional in-person attendant at the property may also be notified (52) via the user interface (32) regarding whether permission has been authorized (54) for person(s) of interest (12) to enter the property. The user interface (32) of the biometric recognition component (14) may also be connected to automated door locking mechanisms that automatically grant authorized entry (54) into the property without requiring the in-person attendant to be present.

Alternatively, if a person(s) of interest (12) is denied entry (56) into the property, either because there is no match between the compared scanned information and stored identification profiles (44) or because the biosecurity protocols (40) have determined that permission to enter the property is unauthorized for a person(s) of interest (12) in view of collective information stored in their corresponding identification profile(s), the user interface (32) may notify (52) the person(s) of interest (12) of this denial. Such notification (52) may be provided to the person(s) of interest (12) via the user interface (32) on the biometric recognition component (14), along with a summary of the reasons for the denial of entry. The optional in-person attendant at the property may also be notified (52) via the user interface (32) regarding whether permission has been denied (56) for person(s) of interest (12) to enter the property. As mentioned above, the user interface (32) of the biometric recognition component (14) may be connected to automated door locking mechanisms that automatically deny entry (56) into the property without requiring the in-person attendant to be present.

As additionally shown in FIGS. 1 and 1B, if a person(s) of interest (12) believes a denial of entry into a property is in error, or in the unlikely event the biometric security component (14) fails or is rendered inoperable, the person(s) of interest (12) may utilize their smart device (60) as a back-up to directly communicate with the server (38) and cloud database (36) to seek admission into the property (58). In particular, the biosecurity protocols (40) may comprise software applications configured on the smart device (60) that track movement and obtain identification information on the person(s) of interest (12). This information may be transmitted over the network (34) and stored in the cloud database (36) in the person(s) of interest's (12) corresponding identification profile (44). Similarly, the person(s) of interest (12) may utilize their smart device (60) to access their identification profiles (44) stored in the cloud database (36) via the server (38). Thus, the person(s) of interest (12) may utilize their smart device (60) to gain entry into the animal production facility and effectively bypass (58) the biometric recognition component (14) if needed. For example, the identity of the person(s) of interest (12) may be verified (48) by comparing information associated with their particular smart device (60) (e.g., phone number, pin number, IP address, etc.) with stored identification profiles (44) in the cloud database (36). Once the identity of the person(s) of interest (12) is verified (48), the biosecurity protocols (40) may comprise determining (50) whether permission to enter the property has been authorized for the person(s) of interest (12) in view of collective information stored in their corresponding identification profile(s) (44). For example, based on collective information stored in an identification profile (44) the biosecurity protocols (40) may either authorize or deny entry (54, 56) into the property for the person(s) of interest (12) and notify (52) the person(s) of interest (12) accordingly via their smart device (60) and/or the user interface (32). Means of authorization may be accomplished by transmitting a key code, bar code, or other means of authorization to the person(s) of interest's (12) smart device (60). Such forms of authorization may then be inputted/scanned into the user interface (32) of the biometric recognition component (14) for entry into the property (54). Alternatively, such forms of authorization may be visually presented to an in-person attendant for entry or the doors to the property may be automatically unlocked remotely (54). However if the initial denial of entry into the property utilizing the biometric recognition component (14) was not erroneous, then the person(s) of interest (12) will be denied entry into the property again (56).

In another aspect of the present invention, the livestock biosecurity system (10) may be utilized as an employee accountability system. In the livestock industry, it is an unfortunate and common problem for a contractually obligated livestock producer to fail to routinely check on animals under their care as their contract stipulates with the livestock owner. It is also an unfortunate and common problem in the livestock industry for employees to fail to show up for work. To mitigate these problems, the biosecurity protocols (40) of the livestock biosecurity system (10) may include accountability settings that confirm whether the contractually obligated livestock producer is routinely checking on animals under their care as their contract stipulates with the livestock owner. The biosecurity protocols (40) of the livestock biosecurity system (10) may also include accountability settings that confirm whether the biosecurity protocols (40) are actually being followed by employees and/or animal production facility managers at a particular animal production facility. Such accountability settings may also track employees from property to property within the livestock biosecurity system (10) to ensure compliance with cleanliness and disease mitigation standards set forth in the biosecurity protocols (40). Moreover, the biosecurity protocols (40) of the livestock biosecurity system (10) may further include accountability settings that confirm whether employees at a particular property are timely showing up for work and leaving work appropriately. For example, employees may have identification profiles (44) stored in the cloud database (36). Thus, when employees enter or leave the property the biometric recognition component (14) scans and verifies the identity of each employee by comparing scanned information with the stored identification profiles (44) in the cloud database (36). The scanned information, including a timestamp and GPS location of the biometric recognition component (14), thus, effectively acts as reporting time clock for employees at a property. The employee accountability system may be incorporated at all entrances of a property, including internal doors, hallways and rooms, to track and monitor employees at a particular property or a plurality of properties for compliance purposes. The employee accountability system may utilize the existing biosecurity protocols (40) of the livestock biosecurity system (10) including notification capabilities (52) to inform a livestock owner and/or manager of the property that an employee is in compliance with the biosecurity protocols or that violations have occurred. Such notification (52) may be provided to the livestock owner and/or manager of the property via the user interface (32) on the biometric recognition component (14), or email, text message, phone call, or other means of contact on a smart device and may additionally provide a summary of the reasons for compliance or violation. Thus, the livestock biosecurity system (10) of the present invention may also be used as an employee accountability system to conveniently provide oversight at an animal production facility.

Figure 2:
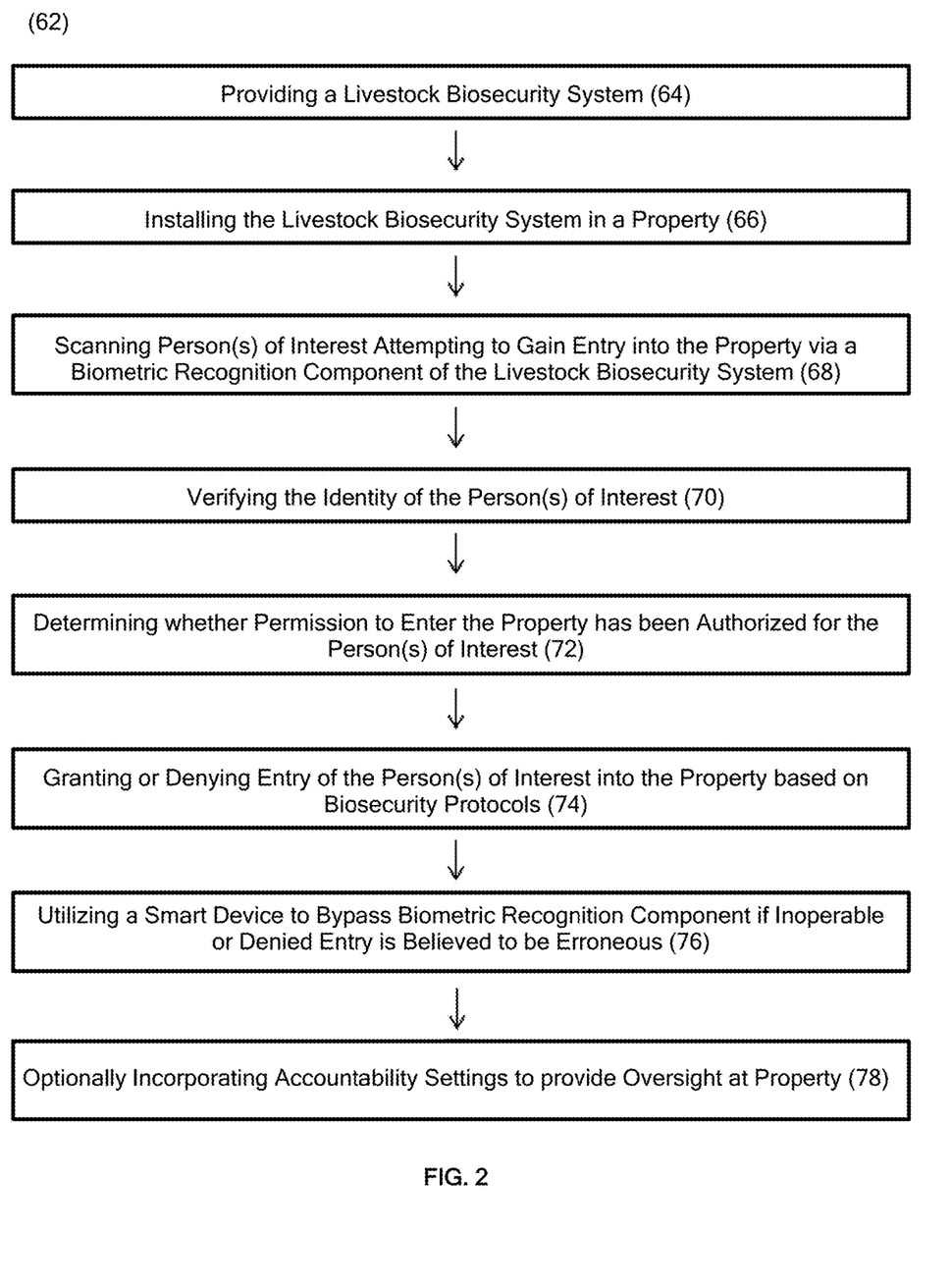
FIG. 2 is a flowchart of a method of the present invention utilizing the livestock biosecurity system of FIG. 1.

FIG. 2 illustrates yet another aspect of the present invention, a method of providing biosecurity to an animal production facility (62). The method may comprise providing the livestock biosecurity system (10) of the present invention as described above (64). The method (62) may further comprise installing the livestock biosecurity system (10) in a property or a plurality of properties, preferably at the entrance(s) of the properties (66). The method (62) may also comprise scanning (68) person(s) of interest (12) attempting to gain entry into the property using the biometric recognition component (14) of the livestock biosecurity system (10). The method (62) further comprises verifying (70) the identity of the person(s) of interest (12) and determining whether permission to enter the property is authorized (72) for the person(s) of interest (12) using the livestock biosecurity system (10). The method (62) may additionally comprise either granting or denying entry (74) to the persons of interest (12) into the property based on the biosecurity protocols (40) set in the livestock biosecurity system (10). If the person(s) of interest (12) believes a denial of entry into the property is in error, or in the unlikely event the biometric security component (14) fails or is rendered inoperable, the method further comprises utilizing a smart device (60) as a back-up to directly communicate with the server (38) and cloud database (36) to seek admission into the property (76). Optionally, the method (62) may further comprise incorporating accountability settings into the biosecurity protocols (40) of the livestock biosecurity system (10) to provide oversight at the property (78).

A general description of the present invention as well as a preferred embodiment to the present invention has been set forth. It is not intended that the present invention be limited to the described embodiment, but may cover all modifications and alternatives, which may be within the spirit and scope of the invention, including application outside of the livestock industry. Those skilled in the art to which the present invention pertains will recognize and be able to practice additional variations in the method and systems described which fall within the teachings of this invention. It is contemplated that the livestock biosecurity system (10) and method of use of the present invention may be utilized in all manner and manufacturers of animal production facilities to provide a uniform and standardized form of biosecurity in the livestock industry. Accordingly, all such modifications and additions are deemed to be within the scope of the invention which is to be limited only by the issued claims.

What is claimed is:

1. A method of providing livestock biosecurity, the method comprising:
   providing a livestock biosecurity system configured to protect livestock at a property, the livestock biosecurity system comprising:
   a) a biometric recognition component, the biometric recognition component comprising:
      i) an intelligent 3D camera;
      ii) memory; and
      iii) a processor;
   b) a cloud database;
   c) a server;
   d) a network connecting the biometric recognition component, cloud database and server; and
   e) biosecurity protocols on the server, processor and/or memory;
   f) the biosecurity protocols comprising employee accountability settings that confirm livestock is being properly cared for at the property;
   installing the biometric recognition component of the livestock biosecurity system at the property;
   storing identification profiles for a plurality of persons of interest in the cloud database and/or memory of the biometric recognition component;
   scanning a person of interest seeking entry into the property using the biometric recognition component, the scan comprising:
   a) a 3D map of the contours of the person of interest's face;
   b) the ability to identify a person of interest from 0.5 to 25 feet over several meters away; and
   c) the ability to identify a plurality of persons of interest simultaneously;
   identifying the person of interest seeking entry into the property by comparing scanned information with identification profiles stored in the memory and/or cloud database;
   verifying the identity of the person of interest by confirming a match between the scanned information and the stored identification profiles;
   denying entry into the property for the person of interest whose identity is unknown because of no match between the scanned information and the stored identification profiles;
   determining whether permission to enter the property has been authorized for the person of interest whose identity is verified, wherein authorization for the person of interest to enter the property is based on:
   a) past movements tracked from one property to another for a set period of time;
   b) admission into a property outside the livestock biosecurity system;
   c) cleanliness levels in view of the person of interest's contact with known pathogens;
   d) the person of interest's travel to geographic locations where biosecurity concerns are present; or
   e) combinations thereof;
   granting or denying the person of interest whose identity is verified entry into the property;
   connecting a smart device to the livestock biosecurity system via the network; and
   utilizing the smart device as a back-up to communicate with the cloud database in the event: (i) the biometric recognition component fails or is rendered inoperable; (ii) the person of interest believes a denial of entry into the property is in error; or (iii) a bypass of the biometric recognition component is needed;
wherein the property comprises a farm, ranch, feedlot, animal production facility, livestock confinement facility, meat processing facility or a combination thereof.

2. The method of providing livestock biosecurity of claim 1, further comprising:
verifying the identity of the person of interest by comparing information associated with the smart device to stored identification profiles in the cloud database;
determining whether permission to enter the property has been authorized for the person of interest;
notifying the person of interest of a grant or denial of entry into the property via the smart device; and
transmitting means of authorization to the smart device to grant the person of interest entry into the property.

3. The method of providing livestock biosecurity of claim 1, the scanned information further comprising:
a) a GPS location of the biometric recognition component; and
b) a timestamp.

4. The method of providing livestock biosecurity of claim 3, further comprising:
automatically collecting the identification profiles, timestamps and/or GPS locations of persons of interest seeking entry into the property via the biometric recognition component; and
storing in the memory and/or cloud database the identification profiles, timestamps and/or GPS locations.

5. The method of providing livestock biosecurity of claim 1, wherein the biometric recognition component is connected to automated door locking mechanisms that automatically deny or grant entry to the person of interest into the property without requiring an in-person attendant to be present.

6. The method of providing livestock biosecurity of claim 1, wherein the employee accountability settings include:
a) confirming that a livestock producer is checking on animals under their care as stipulated by a livestock owner;
b) confirming that biosecurity protocols are being followed by an employee and/or manager of the property;
c) tracking the employee from property to property within the livestock biosecurity system to ensure compliance with biosecurity protocols;
d) notifying the livestock owner and/or manager of the property that the employee is in compliance with biosecurity protocols or that violations have occurred; or
e) combinations thereof.

7. A livestock biosecurity system, comprising:
a biometric recognition component installed at a property, wherein the property comprises a farm, ranch, feedlot, animal production facility, livestock confinement facility, meat processing facility or a combination thereof;
the biometric recognition component comprising:
a) an intelligent 3D camera;
b) memory; and
c) a processor;
a cloud database;
a server;
a network connecting the biometric recognition component, cloud database and server;
biosecurity protocols on the server, processor and/or memory;
the biosecurity protocols comprising employee accountability settings that confirm whether livestock is being properly cared for at the property;
identification profiles for a plurality of persons of interest stored in the cloud database and/or memory of the biometric recognition component;
the biometric recognition component configured to scan a person of interest seeking entry into the property, the scan comprising:
a) a 3D map of the contours of the person of interest's face;
b) the ability to identify a person of interest from 0.5 to 25 feet away; and
c) the ability to identify a plurality of persons of interest simultaneously;
the livestock biosecurity system configured to identify the person of interest seeking entry into the property by comparing scanned information with identification profiles stored in the memory and/or cloud database;
the livestock biosecurity system configured to verify the identity of the person of interest by confirming a match between the scanned information and the stored identification profiles;
the livestock biosecurity system configured to deny entry into the property for the person of interest whose identity is unknown because of no match between the scanned information and the stored identification profiles;
wherein authorization to enter the property for the person of interest whose identity is verified is based on:
a) past movements tracked from one property to another for a set period of time;
b) admission into a property outside the livestock biosecurity system;
c) cleanliness levels in view of the person of interest's contact with known pathogens;
d) the person of interest's travel to geographic locations where biosecurity concerns are present; or
e) combinations thereof;
wherein the livestock biosecurity system is configured to protect livestock at the property.

8. The livestock biosecurity system of claim 7, wherein the biometric recognition component is connected to automated door locking mechanisms configured to automatically deny or grant entry to the person of interest into the property without requiring an in-person attendant to be present.

9. The livestock biosecurity system of claim 7, wherein the employee accountability settings include:
a) confirmation that a livestock producer is checking on animals under their care as stipulated by a livestock owner;
b) confirmation that biosecurity protocols are being followed by an employee and/or manager of the property;
c) tracking the employee from property to property within the livestock biosecurity system to ensure compliance with biosecurity protocols;
d) notification to the livestock owner and/or manager of the property that the employee is in compliance with biosecurity protocols or that violations have occurred; or
e) combinations thereof.

10. The livestock biosecurity system of claim 7, wherein the scanned information further comprises:
a) a GPS location of the biometric recognition component; and
b) a timestamp.

11. The livestock biosecurity system of claim 10, further comprising:
   identification profiles, timestamps and/or GPS locations are automatically collected at the property via the biometric recognition component scanning persons of interest seeking entry into the property; and
   the identification profiles, timestamps and/or GPS locations are stored in the memory and/or cloud database.

12. The livestock biosecurity system of claim 7, wherein the identification profiles for the plurality of persons of interest are stored on the cloud database; and
   wherein the memory of the biometric recognition component is configured to store identification profiles of persons of interest that commonly seek access to the specific property where the biometric recognition component is located.

13. The livestock biosecurity system of claim 7, further comprising:
   a smart device connected to the biometric recognition component and cloud database via the network;
   the smart device configured to be utilized as a back-up to communicate with the cloud database in the event: (i) the biometric recognition component fails or is rendered inoperable; (ii) the person of interest believes a denial of entry into the property is in error; or (iii) a bypass of the biometric recognition component is needed.

14. The livestock biosecurity system of claim 13, further comprising:
   the livestock biosecurity system configured to identify the person of interest seeking entry into the property by comparing information associated with the smart device to identification profiles stored in the memory and/or cloud database;
   the livestock biosecurity system configured to verify the identity of the person of interest by confirming a match between the information associated with the smart device and the stored identification profiles;
   the livestock biosecurity system configured to deny entry into the property for the person of interest whose identity is unknown because of no match between the information associated with the smart device and the stored identification profiles;
   the livestock biosecurity system configured to authorize entry into the property for the person of interest whose identity is verified based on:
      a) past movements tracked from one property to another for a set period of time;
      b) admission into a property outside the livestock biosecurity system;
      c) cleanliness levels in view of the person of interest's contact with known pathogens;
      d) the person of interest's travel to geographic locations where biosecurity concerns are present; or
      e) combinations thereof;
   the livestock biosecurity system configured to transmit means of authorization to the smart device to grant the person of interest entry into the property.

15. A method of providing biosecurity at a property, the method comprising:
   providing a livestock biosecurity system configured to protect livestock at the property, the livestock biosecurity system comprising:
      a) a biometric recognition component comprising an intelligent 3D camera, memory and a processor;
      b) a cloud database;
      c) a server;
      d) a network connecting the biometric recognition component, cloud database and server; and
      e) biosecurity protocols on the server and/or biometric recognition component;
      f) the biosecurity protocols comprising employee accountability settings that confirm whether livestock is being properly cared for at the property, wherein the employee accountability settings include:
         i. confirming that a livestock producer is checking on animals under their care as stipulated by a livestock owner;
         ii. confirming that biosecurity protocols are being followed by an employee and/or manager of the property;
         iii. tracking the employee from property to property within the livestock biosecurity system to ensure compliance with biosecurity protocols;
         iv. notifying the livestock owner and/or manager of the property that the employee is in compliance with biosecurity protocols or that violations have occurred; or
         v. combinations thereof;
   installing the biometric recognition component of the livestock biosecurity system at a property;
   scanning a person of interest attempting to gain entry into the property via the biometric recognition component;
   verifying the identity of the person of interest;
   determining whether permission to enter the property has been authorized for the person of interest;
   granting or denying the person of interest entry into the property based on:
      a) past movements of the person of interest tracked from one property to another for a set period of time;
      b) admission of the person of interest into a property outside the livestock biosecurity system;
      c) cleanliness levels in view of the person of interest's contact with known pathogens;
      d) the person of interest's travel to geographic locations where biosecurity concerns are present; or
      e) combinations thereof;
   connecting a smart device to the livestock biosecurity system via the network; and
   utilizing the smart device as a back-up to communicate with the cloud database in the event: (i) the biometric recognition component fails or is rendered inoperable; (ii) the person of interest believes a denial of entry into the property is in error; or (iii) a bypass of the biometric recognition component is needed;
   wherein the property comprises a farm, ranch, feedlot, animal production facility, livestock confinement facility, meat processing facility or a combination thereof.

16. The method of providing biosecurity at a property of claim 15, further comprising:
   compiling and storing identification profiles for a plurality of persons of interest;
   scanning a person of interest seeking entry into the property via the biometric recognition component;
   verifying the identity of the person of interest by comparing scanned information with the stored identification profiles in the cloud database and/or memory;
   determining whether permission to enter the property has been authorized for the person of interest;
   notifying the person of interest of a grant or denial of entry into the property; and
   granting or denying the person of interest entry into the property.

17. The method of providing biosecurity at a property of claim 15, wherein the biometric recognition component is connected to automated door locking mechanisms that automatically deny or grant entry to the person of interest into the property without requiring an in-person attendant to be present.

\* \* \* \* \*

UNITED STATES PATENT AND TRADEMARK OFFICE
CERTIFICATE OF CORRECTION

PATENT NO. : 11,321,982 B2
APPLICATION NO. : 16/287018
DATED : May 3, 2022
INVENTOR(S) : Novero et al.

Page 1 of 1

It is certified that error appears in the above-identified patent and that said Letters Patent is hereby corrected as shown below:

In the Claims

In Claim 1, at Column 10, Line 33, please delete the words "over several meters".

Signed and Sealed this
Twenty-seventh Day of August, 2024

Katherine Kelly Vidal
*Director of the United States Patent and Trademark Office*